United States Patent
Kim

(10) Patent No.: US 12,103,566 B2
(45) Date of Patent: Oct. 1, 2024

(54) STEERING CONTROL APPARATUS AND METHOD IN AUTONOMOUS DRIVING MODE

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 171 days.

(21) Appl. No.: 17/231,318

(22) Filed: Apr. 15, 2021

(65) Prior Publication Data
US 2021/0323579 A1   Oct. 21, 2021

(30) Foreign Application Priority Data

Apr. 16, 2020   (KR) .................. 10-2020-0045894

(51) Int. Cl.
G05D 1/00    (2024.01)
B60W 50/00   (2006.01)
B60W 60/00   (2020.01)

(52) U.S. Cl.
CPC ........ B60W 60/0053 (2020.02); B60W 50/00 (2013.01); G05D 1/0061 (2013.01);
(Continued)

(58) Field of Classification Search
CPC .. G05D 1/0212; G05D 1/0088; B62D 5/0493; B62D 6/00; B62D 15/02;
(Continued)

(56) References Cited

U.S. PATENT DOCUMENTS

2012/0283910 A1* 11/2012 Lee ................... B62D 1/286
                                                     701/41
2016/0059886 A1*  3/2016 Tsunoda ........... B62D 5/0484
                                                     701/43
(Continued)

FOREIGN PATENT DOCUMENTS

CN    101365616 A    2/2009
CN    104245479 A    12/2014
(Continued)

OTHER PUBLICATIONS

Du et al., Active Return-to-Center Control Based on Torque and Angle Sensors for Electric Power Steering Systems (Year: 2018).*
(Continued)

*Primary Examiner* — Elaine Gort
*Assistant Examiner* — Chanmin Park
(74) *Attorney, Agent, or Firm* — NSIP Law

(57) ABSTRACT

A steering control apparatus includes: a command steering angle acceleration detector configured to detect a command steering angle acceleration, in an autonomous driving mode, using a command steering angle inputted from an autonomous driving system; an autonomous driving determiner configured to determine whether to cancel the autonomous driving mode using any one or any combination of any two or more of a column torque of a steering shaft, a vehicle speed of a vehicle, and the command steering angle acceleration; and a steering angle controller configured to control a steering angle, in the autonomous driving mode, by adjusting a gain according to a steering angle error between the command steering angle and a current steering angle, based on an output from the command steering angle acceleration detector.

18 Claims, 4 Drawing Sheets

(52) U.S. Cl.
CPC .............. *B60W 2050/0055* (2013.01); *B60W 2510/205* (2013.01); *B60W 2520/10* (2013.01); *B60W 2520/12* (2013.01); *B60W 2710/202* (2013.01); *B60W 2710/205* (2013.01)

(58) Field of Classification Search
CPC ... B62D 15/0265; B62D 5/046; B60W 30/09; B60W 50/00; B60W 60/00; B60W 2050/0021; B60W 2050/0022; B60W 2050/0055; B60W 2050/0056
See application file for complete search history.

(56) References Cited

U.S. PATENT DOCUMENTS

| | | | | |
|---|---|---|---|---|
| 2016/0251827 | A1* | 9/2016 | Ge ......................... | E02F 9/265 |
| | | | | 701/50 |
| 2018/0088572 | A1* | 3/2018 | Uchida ............ | B60W 60/0057 |
| 2018/0281851 | A1* | 10/2018 | Maeda ................. | B62D 5/0469 |
| 2019/0256133 | A1* | 8/2019 | Tsubaki ................. | B62D 6/008 |
| 2019/0263441 | A1* | 8/2019 | Kim ..................... | B62D 5/0463 |
| 2021/0206426 | A1* | 7/2021 | Kitazume ............ | B62D 5/0409 |

FOREIGN PATENT DOCUMENTS

| | | | | |
|---|---|---|---|---|
| CN | 108622186 | A | 10/2018 | |
| CN | 109204298 | A | 1/2019 | |
| CN | 109597317 | A | 4/2019 | |
| CN | 109895843 | A | 6/2019 | |
| CN | 110194211 | A | 9/2019 | |
| EP | 3251911 | A1 * | 12/2017 | ............. B60R 16/02 |
| JP | H 11-49011 | A | 2/1999 | |
| KR | 10-2019-0098783 | A | 8/2019 | |

OTHER PUBLICATIONS

Chinese Office Action issued on Jun. 16, 2023 in corresponding Chinese Patent Application No. 202110412678.0 (10 pages in Chinese).

* cited by examiner

STEERING CONTROL APPARATUS AND METHOD IN AUTONOMOUS DRIVING MODE

CROSS-REFERENCE TO RELATED APPLICATION

This application claims the benefit under 35 U.S.C. § 119(a) of Korean Patent Application No. 10-2020-0045894 filed on Apr. 16, 2020 in the Korean Intellectual Property Office, the entire disclosure of which is incorporated herein by reference for all purposes.

BACKGROUND

Field

Exemplary embodiments of the present disclosure relate to a steering control apparatus and method in an autonomous driving mode, and more particularly, to a steering control apparatus and method in an autonomous driving mode, which can improve steering performance while not canceling the autonomous driving mode in a situation where sudden steering is required during the autonomous driving mode.

Discussion of the Background

In general, when a risk of collision or another accident suddenly occurs during autonomous driving, a vehicle needs to avoid an obstacle by reducing vehicle speed or performing steering control.

Typically, it is effective to reduce vehicle speed in order to avoid a risk. In an emergency situation, however, sudden steering may be required. When the autonomous driving mode is suddenly canceled or not normally operated, a driver may run into danger. Thus, the autonomous driving mode needs to be continuously maintained. In addition, since rapid steering is additionally and momentarily performed, responsiveness needs to be maximized during the moment that steering is performed.

The related art of the present disclosure is disclosed in Korean Patent Application Laid-Open No. 10-2019-0098783 published on Aug. 23, 2019 and entitled "Apparatus for Controlling Handle of Vehicles".

In the related art, autonomous vehicles have been designed to determine that autonomous driving is not normal when sudden steering is performed during autonomous driving, and to cancel the autonomous driving mode.

This is because the condition in which sudden steering is performed does not generally occurs during autonomous driving. If sudden steering is performed, a dangerous situation may occur while a driver significantly leans to the side. Depending on situations, however, sudden steering may need to be performed, under such a condition that a vehicle should urgently avoid an obstacle depending on situations.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a steering control apparatus includes: a command steering angle acceleration detector configured to detect a command steering angle acceleration, in an autonomous driving mode, using a command steering angle inputted from an autonomous driving system; an autonomous driving determiner configured to determine whether to cancel the autonomous driving mode using any one or any combination of any two or more of a column torque of a steering shaft, a vehicle speed of a vehicle, and the command steering angle acceleration; and a steering angle controller configured to control a steering angle, in the autonomous driving mode, by adjusting a gain according to a steering angle error between the command steering angle and a current steering angle, based on an output from the command steering angle acceleration detector.

The command steering angle acceleration detector may include: a first differentiator configured to detect a command steering angular velocity by differentiating the command steering angle; a second differentiator configured to detect the command steering angle acceleration by differentiating the command steering angular velocity; and a noise filter configured to filter noise of the command steering angle acceleration outputted from the second differentiator.

The autonomous driving determiner may include: a pseudo vibration filtering unit configured to filter a preset frequency component corresponding to vibration similar to a resonance point of a motor driven steering apparatus, among frequency components of the column torque; and an autonomous driving mode determination unit configured to determine whether to maintain the autonomous driving mode according to whether the column torque filtered by the pseudo vibration filtering unit satisfies a condition in which it is determined that a driver has intervened in steering.

The autonomous driving mode determination unit may be further configured to determine whether to maintain the autonomous driving mode based on either one or both of the vehicle speed and the command steering angle acceleration, in response to the column torque being retained at a value greater than or equal to a preset value for a time greater than or equal to a preset time.

The autonomous driving mode determination unit may be further configured to determine whether to maintain the autonomous driving mode based on either one or both of the vehicle speed and the command steering angle acceleration.

The autonomous driving mode determination unit may be further configured to compare a value obtained by multiplying a load of a vehicle load pattern curve based on the vehicle speed by the command steering angle acceleration to a preset autonomous driving cancellation prohibition threshold, and cancel the autonomous driving mode according to the a result of the comparing of the value obtained by multiplying a load of a vehicle load pattern curve based on the vehicle speed by the command steering angle acceleration to the preset autonomous driving cancellation prohibition threshold.

The autonomous driving mode determination unit may be further configured to cancel the autonomous driving mode, in response to the value obtained by multiplying the load of the vehicle load pattern curve based on the vehicle speed by the command steering angle acceleration being equal to or less than the autonomous driving cancellation prohibition threshold.

The steering angle controller may include: a variable high pass filter configured to remove a noise component of the steering angle error between the command steering angle and the current steering angle, by adjusting a cut-off frequency according to an output from the command steering angle acceleration detector; a gain adjusting unit configured to adjust a gain of the variable high pass filter using either one or both of the vehicle speed and the command steering angle acceleration; and a steering angle control unit configured to correct the steering angle error between the command steering angle and the current steering angle, by controlling the steering angle according to the gain of the variable high pass filter, as adjusted by the gain adjusting unit.

The variable high pass filter may be further configured to adjust the cut-off frequency by adjusting a derivative time of a transfer function of the command steering angular velocity from the command steering angle acceleration detector.

The gain adjusting unit may be further configured to adjust the gain by multiplying a load curve gain based on the vehicle speed, the command steering angle acceleration, and a preset ratio.

In another general aspect, a steering control method in an autonomous driving mode includes: detecting command steering angle acceleration using a command steering angle inputted from an autonomous driving system; determining whether to cancel the autonomous driving mode using any one or any combination of any two or more of a column torque of a steering shaft, a vehicle speed of a vehicle, and the command steering angle acceleration; and controlling a steering angle by adjusting a gain according to a steering angle error between the command steering angle and a current steering angle, based on an output from a command steering angle acceleration detector.

The detecting of the command steering angle acceleration may include detecting a command steering angular velocity by differentiating the command steering angle, detecting the command steering angle acceleration by differentiating the command steering angular velocity, and subsequently filtering noise of the command steering angle acceleration.

The determining of whether to cancel the autonomous driving mode may include: filtering a preset frequency component corresponding to vibration similar to a resonance point of a motor driven steering apparatus, among frequency components of the column torque; and determining whether to maintain the autonomous driving mode according to whether the column torque satisfies a condition in which it is determined that a driver has intervened in steering.

The determining of whether to maintain the autonomous driving mode may further include determining whether to maintain the autonomous driving mode based on either one or both of the vehicle speed and the command steering angle acceleration, in response to the column torque being retained at a value greater than or equal to a preset value for a time greater than or equal to a preset time.

The determining of whether to maintain the autonomous driving mode may further include determining whether to maintain the autonomous driving mode based on either one or both of the vehicle speed and the command steering angle acceleration.

The determining of whether to maintain the autonomous driving mode may further include comparing a value obtained by multiplying a load of a vehicle load pattern curve based on the vehicle speed by the command steering angle acceleration to a preset autonomous driving cancellation prohibition threshold, and canceling the autonomous driving mode according to the a result of the comparing of the value obtained by multiplying a load of a vehicle load pattern curve based on the vehicle speed by the command steering angle acceleration to the preset autonomous driving cancellation prohibition threshold.

The determining of whether to maintain the autonomous driving mode may further include canceling the autonomous driving mode, in response to the value obtained by multi-plying the load of the vehicle load pattern curve based on the vehicle speed by the command steering angle acceleration being equal to or less than the autonomous driving cancellation prohibition threshold.

The controlling of the steering angle may include: removing a noise component of the steering angle error between the command steering angle and the current steering angle by adjusting a cut-off frequency of a variable high pass filter according to an output from the command steering angle acceleration detector; adjusting a gain of the variable high pass filter using either one or both of the vehicle speed and the command steering angle acceleration; and correcting the steering angle error between the command steering angle and the current steering angle by controlling the steering angle according to the gain of the variable high pass filter, as adjusted.

The adjusting of the cut-off frequency may include adjusting a derivative time of a transfer function of the command steering angular velocity from the command steering angle acceleration detector.

The adjusting of the gain of the variable high pass filter may include multiplying a load curve gain based on the vehicle speed, the command steering angle acceleration, and a preset ratio.

Other features and aspects will be apparent from the following detailed description, the drawings, and the claims.

DETAILED DESCRIPTION OF THE ILLUSTRATED EMBODIMENTS

Figure 1:
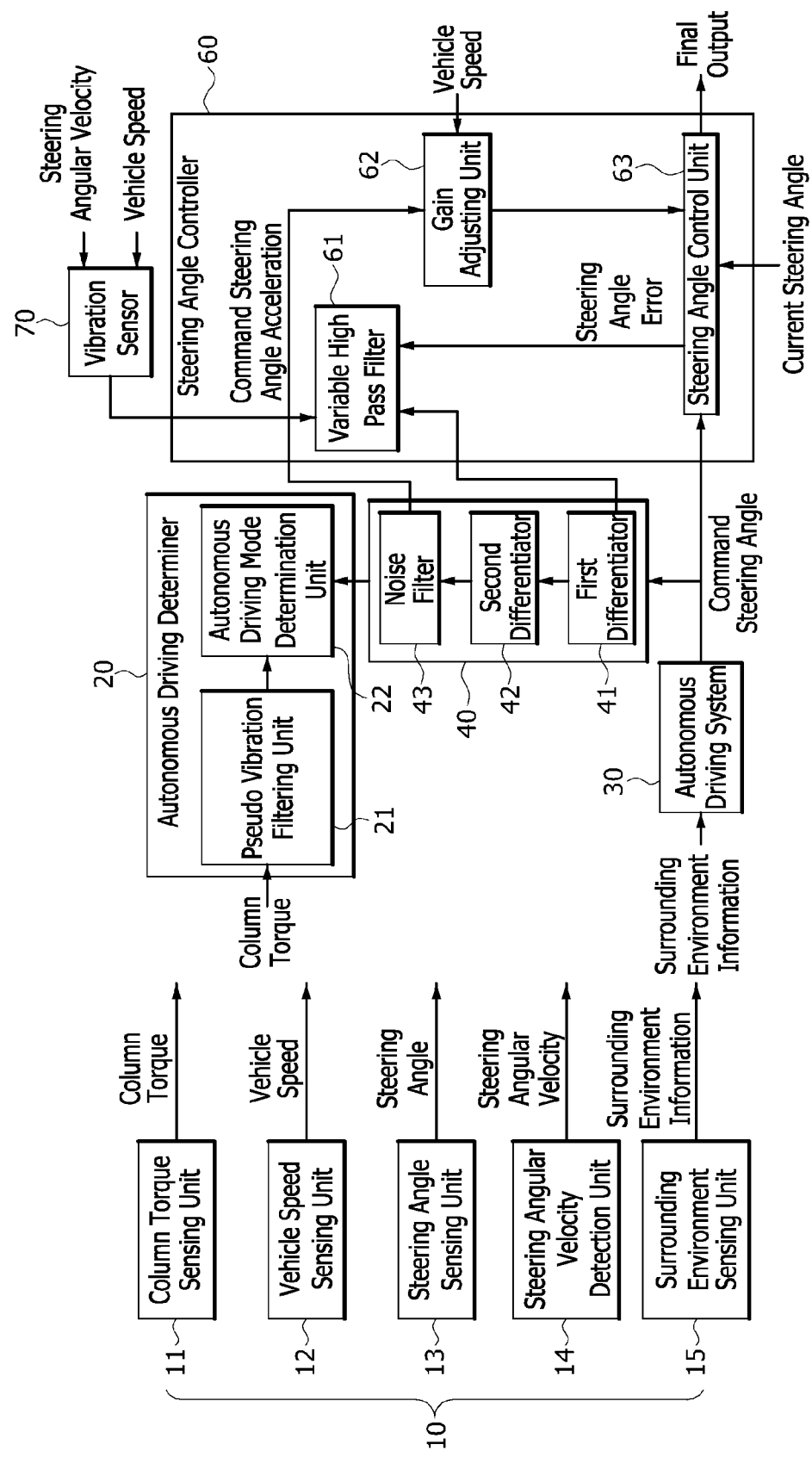
FIG. 1 is a block configuration diagram illustrating a steering control apparatus in an autonomous driving mode in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a steering control apparatus and method in an autonomous driving mode will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

Figure 2:
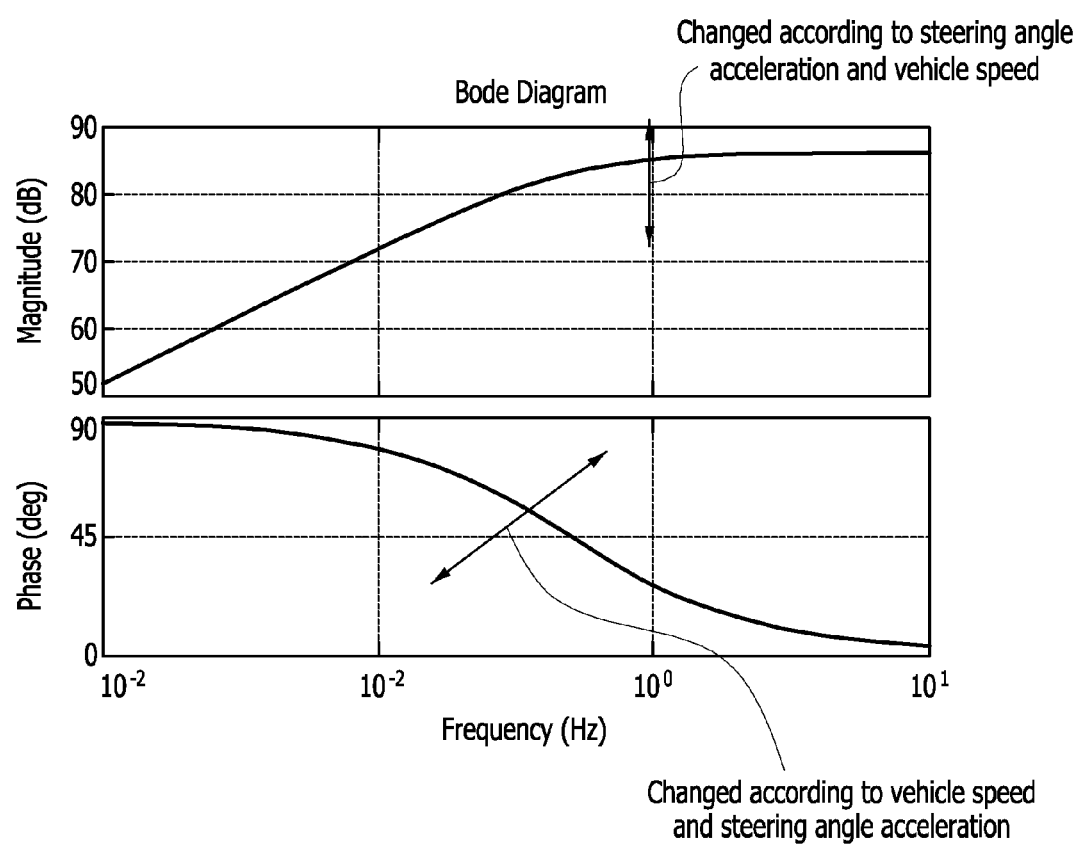
FIG. 2 is a diagram illustrating a change in shape of a high pass filter in accordance with the embodiment of the present disclosure.
Figure 3:
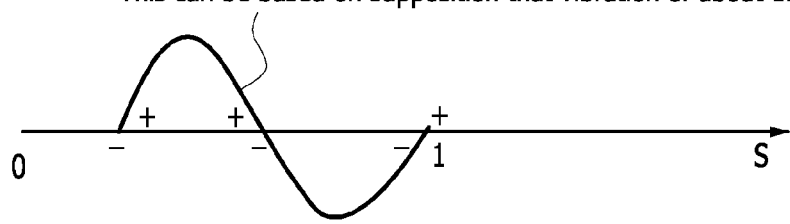
FIG. 3 is a diagram illustrating an example in which the sign of steering angular velocity is changed in accordance with the embodiment of the present disclosure.

FIG. 1 is a block configuration diagram illustrating a steering control apparatus in an autonomous driving mode in accordance with an embodiment of the present disclosure, FIG. 2 is a diagram illustrating a change in shape of a high pass filter in accordance with the embodiment of the present disclosure, and FIG. 3 is a diagram illustrating an example in which the sign of steering angular velocity is changed in accordance with the embodiment of the present disclosure.

Referring to FIG. 1, the steering control apparatus in the autonomous driving mode in accordance with the embodiment of the present disclosure includes a sensing module 10, an autonomous driving determiner 20, an autonomous driving system 30, a command steering angle acceleration detector 40, a steering angle controller 60 and a vibration sensor 70.

The sensing module 10 senses information required for autonomous driving and steering control. The sensing module 10 may include a column torque sensing unit 11 for sensing column torque of a steering shaft, a vehicle speed sensing unit 12 for sensing the vehicle speed of a vehicle, a steering angle sensing unit 13 for sensing the steering angle of a steering wheel, a steering angular velocity detection unit 14 for detecting the steering angular velocity of the steering wheel and a surrounding environment sensing unit 15 for sensing surrounding environment information required for an operation of the autonomous driving system 30.

The steering angular velocity detection unit 14 may directly detect a steering angular velocity from the steering wheel, or detect the steering angular velocity by differentiating the steering angle sensed by the steering angle sensing unit 13.

Examples of the surrounding environment sensing unit 15 may include a lidar, a radar, an ultrasonic sensor, an image sensor and the like. The surrounding environment information may include road information, obstacle information, weather information and the like. The surrounding environment information is not limited to the above-described embodiment.

In the autonomous driving mode, the autonomous driving system 30 outputs a command steering angle for autonomous driving control of the vehicle, based on the surrounding environment information inputted from the surrounding environment sensing unit 15.

Since the configuration in which the autonomous driving system 30 performs autonomous driving control based on the surrounding environment information can be easily carried out by those skilled in the art, the detailed descriptions thereof will be omitted herein.

The command steering angle acceleration detector 40 detects command steering angle acceleration using the command steering angle inputted from the autonomous driving system 30.

The command steering angle acceleration detector 40 includes a first differentiator 41, a second differentiator 42 and a noise filter 43.

The first differentiator 41 detects a command steering angular velocity by primarily differentiating the command steering angle inputted from the autonomous driving system 30.

The second differentiator 42 detects command steering angle acceleration by secondarily differentiating the command steering angular velocity detected by the first differentiator 41.

The noise filter 43 filters noise of the command steering angle acceleration outputted from the second differentiator 42.

The autonomous driving determiner 20 determines whether to cancel the autonomous driving mode using one or more of the column torque of the steering shaft, the speed of the vehicle and the command steering angle acceleration.

The autonomous driving determiner 20 includes a pseudo vibration filtering unit 21 and an autonomous driving mode determination unit 22.

The pseudo vibration filtering unit 21 filters a preset frequency component corresponding to vibration similar to the resonance point of a motor driven steering apparatus, among frequency components of the column torque. As the pseudo vibration filtering unit 21, a band stop filter may be employed.

Typically, in case of unintended steering intervention, vibration similar to the resonance point of a torsion bar of the motor driven steering apparatus may be sensed. Thus, the pseudo vibration filtering unit 21 may filter the frequency component corresponding to vibration similar to the resonance point of the torsion bar of the motor driven steering apparatus, such that column torque of the corresponding frequency component is removed when the autonomous driving is canceled. Therefore, the autonomous driving mode is not canceled in case of unintended steering intervention.

The autonomous driving mode determination unit 22 determines whether to maintain the autonomous driving mode, according to whether the column torque filtered by the pseudo vibration filtering unit 21 satisfies the condition in which it may be determined that a driver has intervened in steering.

That is, when the column torque filtered by the pseudo vibration filtering unit 21 is retained at a preset value or more for a preset time or more, the autonomous driving mode determination unit 22 multiplies a load of a vehicle load pattern curve based on vehicle speed by the command steering angle acceleration, compares the multiplication result to a preset autonomous driving cancellation prohibition threshold, and cancels the autonomous driving mode according to the comparison result.

In this case, the autonomous driving mode determination unit 22 cancels the autonomous driving mode when the value obtained by multiplying the load of the vehicle load pattern curve based on vehicle speed by the command steering angle acceleration is equal to or less than the autonomous driving cancellation prohibition threshold.

More specifically, when the column torque filtered by the pseudo vibration filtering unit 21 is retained at the preset value or more for the preset time or more, the autonomous driving mode determination unit 22 may determine that the driver is intervening in steering. However, even when the autonomous driving system 30 rapidly changes the command steering angle while the driver does not intervene in steering, the column torque may be retained at the preset value or more for the preset time or more. In this case, although the driver did not actually intervene in steering, the autonomous driving mode may be canceled to cause a big accident.

In order to prevent such cancellation, the autonomous driving mode determination unit 22 determines not to cancel the autonomous driving mode through the vehicle speed and the command steering angle acceleration, even though the column torque is retained at the preset value or more for the preset time or more.

In general, depending on the geometry of a vehicle, the load of the vehicle is maximized when the vehicle is stopped, and minimized when the vehicle speed is about 5 kph. As the traveling speed of the vehicle is gradually increased, a self-alignment force increases little by little.

In addition to such features, the column torque is increased as the command steering angle acceleration becomes higher. Thus, although the column torque is retained at the preset value or more for the preset time or more, the autonomous driving mode determination unit 22 does not cancel the autonomous driving mode.

That is, the autonomous driving mode determination unit 22 multiplies the load of the load pattern curve of the vehicle based on vehicle speed by the command steering angle acceleration, and cancels the autonomous driving mode only when the multiplication result is equal to or less than the autonomous driving cancellation prohibition threshold.

Thus, although the autonomous driving system 30 performs sudden steering to avoid an obstacle, the autonomous driving mode may be continuously maintained. Therefore, the vehicle can safely avoid an obstacle or the like even though a driver does not intervene in steering.

The steering angle controller 60 controls the steering angle by adjusting a gain according to a position control error between the command steering angle and the current steering angle, based on an output from the command steering angle acceleration detector 40.

The steering angle controller 60 includes a variable high pass filter 61, a gain adjusting unit 62 and a steering angle control unit 63.

The variable high pass filter 61 removes a noise component of the position control error between the command steering angle and the current steering angle by adjusting a cut-off frequency according to the output from the command steering angle acceleration detector 40. In this case, the variable high pass filter 61 adjusts the cut-off frequency by adjusting the derivative time of a transfer function of the command steering angular velocity inputted from the command steering angle acceleration detector 40.

Typically, in order to momentarily avoid an obstacle or the like, steering angle control performance needs to be momentarily amplified.

When the steering angle control performance is excessively high in a general autonomous driving mode, vibration or the like may occur as control stability is degraded by external noise, surrounding environment or the like. In this case, the steering angle control performance may be rather degraded. Therefore, it is very important to raise the steering angle control performance as much as possible at the time of necessity.

For this operation, it is effective to use a PI-P or PID-PI controller combination without using a position controller based on a P-PI controller combination which is generally used. However, when a D controller is applied, vibration may occur due to noise of the command steering angle, the external environment or noise. In general, the D controller may be added to raise responsiveness to a change in position. In this case, however, since vibration may be amplified and caused by disturbance or noise introduced from the external environment, the steering angle control performance may be rather degraded.

In order to prevent the degradation in steering angle control performance, a low pass filter or lag-compensator is generally applied to the previous stage of the D-controller. In this case, however, the structure becomes complicated, and the number of parameters or factors to be changed increases when the structure needs to be varied depending on a steering situation. That is, in order to secure the steering angle control performance, a P controller in the P-PI controller combination may be designed as a PI or PID controller to use a PI-PI or PID-PI controller combination. However, there is a need for a more efficient method which can maximize the steering angle control performance depending on a steering situation, and significantly improve the responsiveness while having resistance to noise or disturbance.

Typically, when a low pass filter or lag-compensator is applied to the D controller in the PID controller, the transfer function may be expressed as $G(s)=Kp(1+1/Ti \times s+Td \times s/(1+s \times Td))$.

Here, G(s) represents the transfer function, Kp represents a proportional gain, Ti represents an integral time, Td represents a derivative time, and s is a complex number.

When the PID control gain is separated to rearrange the equation or the gain Kp is separated according to the I or D controller, the equation may be expressed as $G(s)=kp+Ki/Ti \times s+Kd \times s/(1+Td \times s)$. At this time, for the D controller, the equation may be rearranged as $(1/Td)/((1/Td)+s)) \times Td \times Kp \times s$.

Here, Ki represents an integral gain, and Kd represents a differential gain.

Furthermore, $(1/Td)/((1/Td)+s))$ and s are similar to the shape of a primary high pass filter. In order to improve the steering angle control performance without applying the D controller, the variable high pass filter 61 and the gain adjusting unit 62 may be applied. In this case, the resistance to noise and the steering angle control performance may be significantly improved.

In particular, the gain and cut-off frequency of the variable high pass filter 61 are very important. Typically, the cut-off frequency of the high pass filter may be set by applying the motor control bandwidth of a motor driven steering apparatus, for example, MDPS (Motor Driven Power Steering). However, in order to have no influence on the resonance point of the torsion bar of the MDPS, it is very important to set the cut-off frequency of the high pass filter with a cut-off point set to about 12 Hz in the case of C-MDPS or about 9 Hz in the case of R-MDPS. For reference, a factor that has the largest influence on the stability of the MDPS is the torsion bar. This is because the torsion bar has the lowest stiffness and is the point where resonance most easily occurs due to the lowest stiffness.

In general, Td may define the control period and frequency of the D controller in the PID controller. In (1/Td)/((1/Td)+s))×Td×Kp×s of the transfer function, (1/Td)/((1/Td)+s)) is equal to the shape of the high pass filter, and can be set to a desired frequency through 1/Td. That is, the transfer filter of the general high pass filter may be expressed as s/(s+w). Here, w is $2\pi f$ where f represents the cut-off frequency. In the above-described transfer function, 1/Td directly becomes w. Thus, the variable high pass filter 61 may adjust the cut-off frequency by varying Td, in order to set a desired frequency.

The gain adjusting unit 62 adjusts the gain by multiplying a load curve gain based on vehicle speed, the command steering angle acceleration and a preset ratio.

The gain adjusting unit 62 varies the differential gain Kd in order to control the gain. As defined above, the gain adjusting unit 62 may vary the gain response characteristic of the steering angle control unit 63 by increasing Kd as the steering angle acceleration in the transfer function becomes higher, and decreasing Kd as the steering angle acceleration becomes lower.

Important factors to decide the gain are the vehicle speed and the command steering angle acceleration. In order to decide a load of the vehicle and a load applied to the MDPS, the vehicle speed and the command steering angle acceleration need to be necessarily considered.

Thus, the gain adjusting unit 62 finally sets the gain by multiplying the load curve gain based on vehicle speed, the command steering angle acceleration and a ratio for maintaining a proper parameter. The ratio may be set to various values in consideration of various sudden steering environments under an actual autonomous driving condition. As a result, the shape of the variable high pass filter 61 is changed as illustrated in FIG. 2.

The steering angle control unit 63 corrects a steering angle error between the command steering angle and the current steering angle by controlling the steering angle according to the gain adjusted by the gain adjusting unit 62.

That is, the steering angle control unit 63 compares the command steering angle inputted from the autonomous driving system 30 to the current steering angle inputted from the steering angle sensing unit 13, and inputs the steering angle error to the variable high pass filter 61.

Furthermore, the steering angle control unit 63 improves the response characteristics of the steering angle, and minimizes the error between the command steering angle and the current steering angle, according to the gain inputted from the gain adjusting unit 62.

The vibration sensor 70 returns the cut-off frequency or the gain to the initial value according to variation based on the number of times that the sign of the steering angular velocity is changed.

Typically, when sudden steering is performed during autonomous driving, vibration or the like may be generated by a factor such as the external environment. In this case, the vibration needs to be sensed in order to prevent an excessive gain increase or cut-off frequency change.

For this operation, the vibration sensor 70 monitors, in real time, the number of times that the sign of the steering angular velocity is changed during a vibration set time. For example, when the sign of the steering angular velocity is changed a total of three times for a counter time of one second as illustrated in FIG. 3, it may be determined that a noise of 1 Hz occurred.

Typically, since the stiffness of a torsion bar is the lowest in an MDPS, vibration occurs most frequently at the resonance frequency of the torsion bar. The vibration typically ranges from 8 to 12 Hz. For example, it may be assumed that a vibration of 8 Hz occurs when the sign of the steering angular velocity is changed 17 times per second. This may be based on the supposition that a G gain was excessively increased, or the cut-off frequency of the variable high pass filter 61 was excessively lowered. Therefore, the vibration sensor 70 senses vibration based on the number of times that the sign of the steering angular velocity is changed, and returns the cut-off frequency or the gain to the initial value when the sensed vibration is equal to or more than preset vibration.

The initial value is a G gain or cut-off frequency in a general autonomous driving mode.

Through this operation, the cancellation of the autonomous driving may be prohibited in case of sudden steering, and the performance of the steering angle control unit 63 may be maximized through the variable high pass filter 61, such that an autonomous vehicle can avoid an obstacle in an emergency situation.

Besides, the varied variable high pass filter 61 may be restored according to a general autonomous driving situation. When vibration occurred in case of sudden steering, the vibration may be sensed to optimize the variable high pass filter 61, which makes it possible to prevent side effects caused by sudden steering.

Hereafter, a steering control method in an autonomous driving mode in accordance with an embodiment of the present disclosure will be described with reference to FIG. 4.

Figure 4:
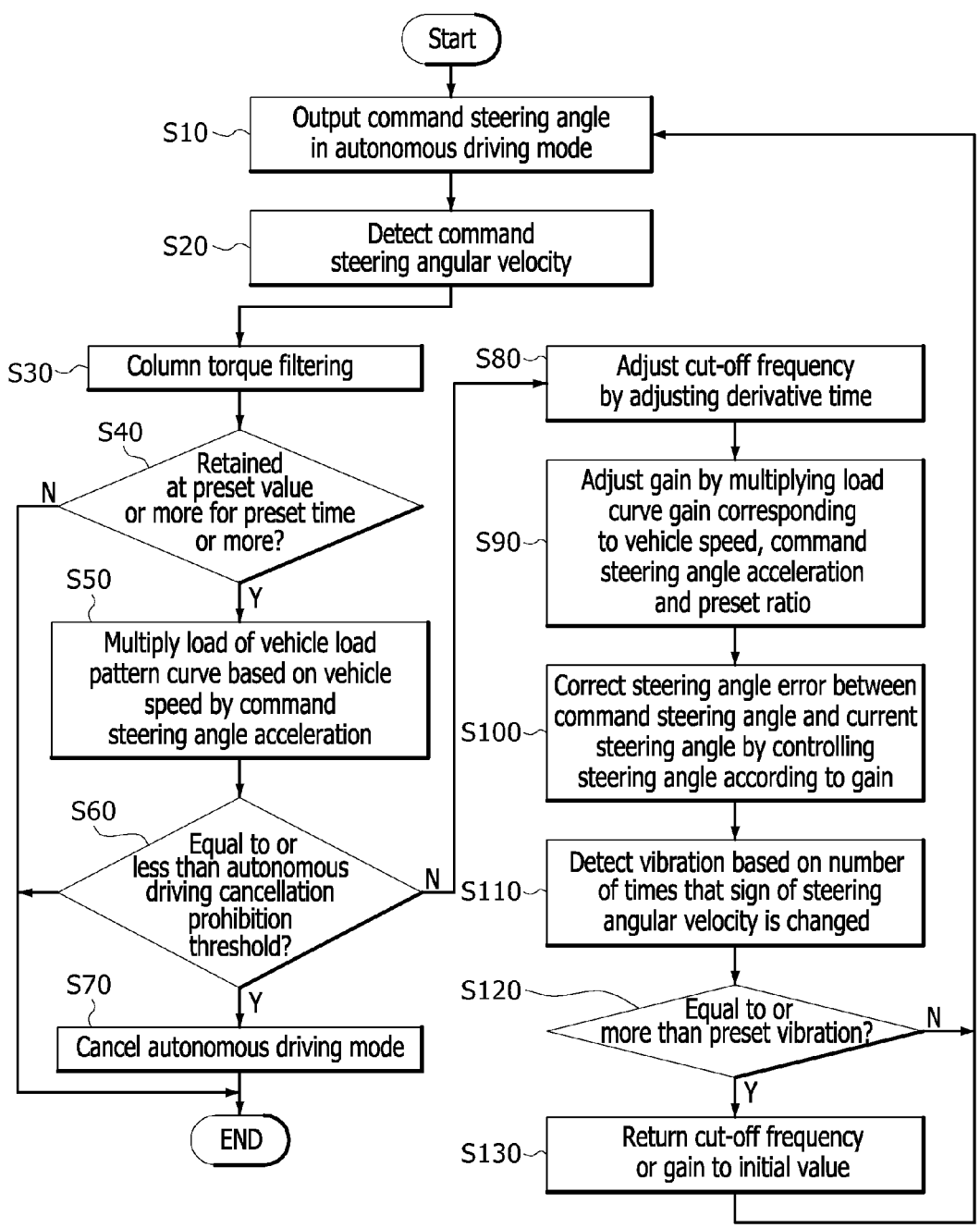
FIG. 4 is a flowchart illustrating a steering control method in an autonomous driving mode in accordance with an embodiment of the present disclosure.

FIG. 4 is a flowchart illustrating a steering control method in an autonomous driving mode in accordance with an embodiment of the present disclosure.

Referring FIG. 4, in the autonomous driving mode, the autonomous driving system 30 outputs a command steering angle for autonomous driving control of the vehicle, based on surrounding environment information inputted from the surrounding environment sensing unit, in step S10.

Then, the first differentiator 41 detects a command steering angular velocity by primarily differentiating the command steering angle, the second differentiator 42 detects command steering angle acceleration by secondarily differentiating the command steering angular velocity, and the noise filter 43 detects command steering angle acceleration by filtering the noise of the command steering angle acceleration, in step S20.

The pseudo vibration filtering unit 21 filters a preset frequency component corresponding to vibration similar to the resonance point of a motor driven steering apparatus, among frequency components of column torque, in step S30.

Then, the autonomous driving mode determination unit 22 determines whether the column torque filtered by the pseudo vibration filtering unit 21 is retained at a preset value or more for a preset time or more, in step S40.

When the determination result of step S40 indicates that the column torque is retained at the preset value or more for the preset time or more, the autonomous driving mode determination unit 22 multiplies the load of a vehicle load pattern curve based on vehicle speed by the command steering angle acceleration in step S50, and determines whether the multiplication result is equal to or less than a preset autonomous driving cancellation prohibition threshold, in step S60.

When the determination result of step S60 indicates that the multiplication result is equal to or less than the autonomous driving cancellation prohibition threshold, the autonomous driving mode determination unit 22 cancels the autonomous driving mode in step S70.

On the other hand, when the determination result of step S60 indicates that the multiplication result exceeds the autonomous driving cancellation prohibition threshold, the autonomous driving mode determination unit 22 continuously maintains the autonomous driving mode.

The steering angle control unit 63 compares the command steering angle inputted from the autonomous driving system 30 to the current steering angle inputted from the steering angle sensing unit 13, and inputs the steering angle error to the variable high pass filter 61.

In this case, the variable high pass filter 61 adjusts a cut-off frequency according to an output from the command steering angle acceleration detector 40 in step S80, and removes a noise component of a position control error between the command steering angle and the current steering angle according to the adjusted cut-off frequency.

The gain adjusting unit 62 adjusts a gain by multiplying a load curve gain based on vehicle speed, command steering angle acceleration and a preset ratio, in step S90.

Thus, the steering angle control unit 63 corrects a steering angle error between the command steering angle and the current steering angle by controlling the steering angle according to the gain adjusted by the gain adjusting unit 62, in step S100.

During this process, the vibration sensor 70 senses vibration of the steering angle by monitoring, in real time, the number of times that the sign of the steering angular velocity is changed during a vibration set time, in step S110, and determines whether the sensed vibration is equal to or more than preset vibration, in step S120.

When the determination result of step S120 indicates that the vibration is equal to or more than the preset vibration, the vibration sensor 70 returns the cut-off frequency or the gain to the initial value, in step S130.

As such, the steering control apparatus and method in the autonomous driving mode in accordance with the embodiment of the present disclosure can improve the steering performance while not canceling the autonomous driving mode in such a situation that sudden steering is required in the autonomous driving mode, and allow the vehicle to urgently avoid a dangerous moment.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering control apparatus, comprising:
    a command steering angle acceleration detector configured to detect a command steering angle acceleration, in an autonomous driving mode, using a command steering angle inputted from an autonomous driving system;
    an autonomous driving determiner configured to determine whether to cancel the autonomous driving mode using a column torque of a steering shaft, a vehicle speed of a vehicle, and the command steering angle acceleration;
    a steering angle controller configured to control a steering angle, in the autonomous driving mode, by adjusting a gain according to a steering angle error between the command steering angle and a current steering angle, based on an output from the command steering angle acceleration detector; and
    an autonomous driving mode determination unit configured to compare a value obtained by multiplying a load of a vehicle load pattern curve based on the vehicle speed by the command steering angle acceleration to a preset autonomous driving cancellation prohibition threshold, and cancel the autonomous driving mode according to the a result of the comparing of the value obtained by multiplying a load of a vehicle load pattern curve based on the vehicle speed by the command steering angle acceleration to the preset autonomous driving cancellation prohibition threshold.

2. The steering control apparatus of claim 1, wherein the command steering angle acceleration detector comprises:
    a first differentiator configured to detect a command steering angular velocity by differentiating the command steering angle;
    a second differentiator configured to detect the command steering angle acceleration by differentiating the command steering angular velocity; and
    a noise filter configured to filter noise of the command steering angle acceleration outputted from the second differentiator.

3. The steering control apparatus of claim 1, wherein the autonomous driving determiner comprises:
    a pseudo vibration filtering unit configured to filter a preset frequency component corresponding to vibration similar to a resonance point of a motor driven steering apparatus, among frequency components of the column torque.

4. The steering control apparatus of claim 1, wherein the autonomous driving mode determination unit is further configured to determine whether to maintain the autonomous driving mode based on either one or both of the vehicle speed and the command steering angle acceleration, in response to the column torque being retained at a value greater than or equal to a preset value for a time greater than or equal to a preset time.

5. The steering control apparatus of claim 1, wherein the autonomous driving mode determination unit is further configured to determine whether to maintain the autonomous driving mode based on either one or both of the vehicle speed and the command steering angle acceleration.

6. The steering control apparatus of claim 1, wherein the autonomous driving mode determination unit is further configured to cancel the autonomous driving mode, in response to the value obtained by multiplying the load of the vehicle load pattern curve based on the vehicle speed by the command steering angle acceleration being equal to or less than the autonomous driving cancellation prohibition threshold.

7. The steering control apparatus of claim 1, wherein the steering angle controller comprises:
    a variable high pass filter configured to remove a noise component of the steering angle error between the command steering angle and the current steering angle, by adjusting a cut-off frequency according to an output from the command steering angle acceleration detector;
    a gain adjusting unit configured to adjust a gain of the variable high pass filter using either one or both of the vehicle speed and the command steering angle acceleration; and
    a steering angle control unit configured to correct the steering angle error between the command steering angle and the current steering angle, by controlling the steering angle according to the gain of the variable high pass filter, as adjusted by the gain adjusting unit.

8. The steering control apparatus of claim 7, wherein the variable high pass filter is further configured to adjust the cut-off frequency by adjusting a derivative time of a transfer function of the command steering angular velocity from the command steering angle acceleration detector.

9. The steering control apparatus of claim 7, wherein the gain adjusting unit is further configured to adjust the gain by multiplying a load curve gain based on the vehicle speed, the command steering angle acceleration, and a preset ratio.

10. A steering control method in an autonomous driving mode, comprising:
    detecting command steering angle acceleration using a command steering angle inputted from an autonomous driving system;
    determining whether to cancel the autonomous driving mode using a column torque of a steering shaft, a vehicle speed of a vehicle, and the command steering angle acceleration;
    controlling a steering angle by adjusting a gain according to a steering angle error between the command steering angle and a current steering angle, based on an output from a command steering angle acceleration detector; and
    determining whether to maintain the autonomous driving mode by comparing a value obtained by multiplying a load of a vehicle load pattern curve based on the vehicle speed by the command steering angle acceleration to a preset autonomous driving cancellation prohibition threshold, and canceling the autonomous driving mode according to the a result of the comparing of the value obtained by multiplying a load of a vehicle load pattern curve based on the vehicle speed by the command steering angle acceleration to the preset autonomous driving cancellation prohibition threshold.

11. The steering control method of claim 10, wherein the detecting of the command steering angle acceleration comprises detecting a command steering angular velocity by differentiating the command steering angle, detecting the command steering angle acceleration by differentiating the command steering angular velocity, and subsequently filtering noise of the command steering angle acceleration.

12. The steering control method of claim 10, wherein the determining of whether to cancel the autonomous driving mode further comprises:
    filtering a preset frequency component corresponding to vibration similar to a resonance point of a motor driven steering apparatus, among frequency components of the column torque; and
    determining whether to maintain the autonomous driving mode according to whether the column torque satisfies a condition in which it is determined that a driver has intervened in steering.

13. The steering control method of claim 12, wherein the determining of whether to maintain the autonomous driving mode further comprises determining whether to maintain the autonomous driving mode based on either one or both of the vehicle speed and the command steering angle acceleration, in response to the column torque being retained at a value greater than or equal to a preset value for a time greater than or equal to a preset time.

14. The steering control method of claim 12, wherein the determining of whether to maintain the autonomous driving mode further comprises determining whether to maintain the autonomous driving mode based on either one or both of the vehicle speed and the command steering angle acceleration.

15. The steering control method of claim 10, wherein the determining of whether to maintain the autonomous driving mode further comprises canceling the autonomous driving mode, in response to the value obtained by multiplying the load of the vehicle load pattern curve based on the vehicle speed by the command steering angle acceleration being equal to or less than the autonomous driving cancellation prohibition threshold.

16. The steering control method of claim 10, wherein the controlling of the steering angle comprises:
    removing a noise component of the steering angle error between the command steering angle and the current steering angle by adjusting a cut-off frequency of a variable high pass filter according to an output from the command steering angle acceleration detector;
    adjusting a gain of the variable high pass filter using either one or both of the vehicle speed and the command steering angle acceleration; and
    correcting the steering angle error between the command steering angle and the current steering angle by controlling the steering angle according to the gain of the variable high pass filter, as adjusted.

17. The steering control method of claim 16, wherein the adjusting of the cut-off frequency comprises adjusting a derivative time of a transfer function of the command steering angular velocity from the command steering angle acceleration detector.

18. The steering control method of claim 16, wherein the adjusting of the gain of the variable high pass filter comprises multiplying a load curve gain based on the vehicle speed, the command steering angle acceleration, and a preset ratio.

* * * * *